United States Patent
Bernard et al.

(10) Patent No.: US 8,165,365 B2
(45) Date of Patent: Apr. 24, 2012

(54) METHOD AND SYSTEM FOR DISPLAYING TOMOSYNTHESIS IMAGES

(75) Inventors: Sylvain Bernard, Montigny le Bretonneux (FR); Bruno Le Corgne, Gif S/Yvette (FR); Francois Peter, Boulevard Raspail (FR)

(73) Assignee: General Electric Company, Schenectady, NY (US)

( * ) Notice: Subject to any disclaimer, the term of this patent is extended or adjusted under 35 U.S.C. 154(b) by 991 days.

(21) Appl. No.: 12/133,595

(22) Filed: Jun. 5, 2008

(65) Prior Publication Data

US 2009/0034684 A1 Feb. 5, 2009

(30) Foreign Application Priority Data

Aug. 2, 2007 (FR) ...................... 07 56896

(51) Int. Cl.
*G06K 9/00* (2006.01)

(52) U.S. Cl. .......................... 382/128; 382/131; 378/62

(58) Field of Classification Search .................. 382/128, 382/131, 132; 378/62
See application file for complete search history.

(56) References Cited

U.S. PATENT DOCUMENTS 7,142,633 B2 * 11/2006 Eberhard et al. ................ 378/62
7,295,691 B2 * 11/2007 Uppaluri et al. ............... 382/130
2005/0065421 A1 3/2005 Burckhardt
2005/0096530 A1 5/2005 Daw et al.

FOREIGN PATENT DOCUMENTS

EP 1 063 617 A1 12/2000

OTHER PUBLICATIONS

Xinapse Systems: "Region of Interest (ROI) Creation." Internet Citation, [Online], Feb. 8, 2003, XP002443467.
Viega, J et al: "3D Magic Lenses." UIST '96. 9TH Annual Symposium on User Interface Software. Seattle, Washington, Nov. 6-8, 1996. pp. 51-58, XP000728616.

* cited by examiner

*Primary Examiner* — Louis Arana
(74) *Attorney, Agent, or Firm* — Global Patent Operation; Jonathan E. Thomas

(57) ABSTRACT

An embodiment of a method for displaying a volume obtained by tomosynthesis includes displaying a two-dimensional image. It further includes receiving user input that defines on the displayed image at least one volume of interest associated with a two-dimensional region of interest located in a plane of the image. The method further includes displaying in the region of interest, according to a practitioner's wishes: (a) images of slices of the volume of interest; (b) three-dimensional images of the volume of interest; and/or (c) slabs obtained from the volume of interest.

14 Claims, 5 Drawing Sheets

METHOD AND SYSTEM FOR DISPLAYING TOMOSYNTHESIS IMAGES

CROSS-REFERENCE TO RELATED APPLICATIONS

This application claims the benefit of priority, under 35 U.S.C. 119(a)-(d), (f) to prior-filed French patent application serial number 0756896, filed on 2 Aug. 2007, the contents of which are herein incorporated by reference in their entirety.

FIELD OF THE INVENTION

The field of the invention relates to tomosynthesis generally, and in particular to a method and a system for displaying volumes obtained by tomosynthesis.

It is applicable especially, but not exhaustively, to a 3D radiography imaging technique of the breast, called DBT (Digital Breast Tomosynthesis), or other organs in traditional radiology.

BACKGROUND TO THE INVENTION

Tomosynthesis imagery is a three-dimensional imaging technique using limited-angle tomography. This technique makes it possible to reconstruct a three-dimensional (3D) volume in slices from a series of bi-dimensional (2D) projection images acquired using different angles of the X-ray tube.

In this volume, the practitioner attempts to identify lesions, such as, in the breast, for example, microcalcification or opacity foci, or, in the lung, potentially cancerous nodules. The practitioner can also seek to repair a bone fracture, for example in the hand or shoulder. These lesions and fractures, visible using a radiography imaging technique, can be generally referred to as "radiological signs".

In the state of the art, the practitioner examines the volume slice by slice. However, a radiological sign may be distributed over several slices. Consequently, visualizing one given slice of a radiological sign does not allow the practitioner to acquire all of the information relative to this sign. One therefore seeks to be able to visualize the information contained in a volume corresponding to the radiological sign.

It is already known to present practitioners not with only one slice but with a slice corresponding to the integration of several slices, namely an image referred to as a "slab".

This type of image is not without difficulties, insofar as one strengthens, over the entire image (including in areas located outside the region containing the radiological sign), the superimposed tissue-type artifacts, which is in contradiction with the initial objective of tomosynthesis, namely is to reduce the superposition of tissues with regard to standard 2D radiography.

One purpose of the invention is therefore to propose a display method that is easy for a practitioner to use and that provides the practitioner with as much information as possible on the radiological signs he wishes to analyze.

One example of an imaging system allowing implementation of the invention is diagrammatically illustrated in FIG. 1. We will briefly describe the various devices making up the imaging system, these devices being known to those skilled in the art.

Traditionally, the tomosynthesis device 10 comprises an x-ray source 12 which can be fixed to a support such as a C-shaped arm, a leg or an examining table, which allows movement of the x-ray source 12 in a limited region 14. In FIG. 1, to simplify the illustration, the limited region 14 is flat, but one skilled in the art understands that this schematization is in no way exhaustive and that the x-ray source 12 can, for example, be moved following an arc of a circle or in a three-dimensional region. A collimator can be arranged so as to define the dimensions and shape of the bundle 16 of X rays crossing a region wherein a subject such as a human patient 18 is located. Part 20 of the ray passes through the patient 18, and strikes a detector 22. The detector 22 may include, for example, a plurality of detection elements, corresponding globally to pixels, which produce an electrical signal representing the intensity of the incident X rays. These signals are acquired and processed to reconstruct, in real-time or nearly, an image of the details of the subject. Traditionally, the signals are recorded according to several angles around the patient so as to collect several radiographic views.

The source 12 is controlled by a control unit 24 which provides it with both electricity and control signals for examination sequences. More specifically, the control unit 24 controls the activation and operation of the x-ray source 12 through an X ray control device 26. The control unit 24 also controls the movement of the source 12 in the limited region 14 through a motor control device 28, which moves the source 12 so as to give it the desired position and orientation relative to the patient 18 and the detector 22. Moreover, the detector 22 is coupled to the control unit 24, which controls the acquisition of signals generated in the detector 22. Overall, the control unit 24 controls the operation of the imaging system to carry out examination protocols and to acquire the resulting data.

Moreover, the control unit 24 comprises a data acquisition system 30 which receives the analog signals from the detector 22 and converts them into digital signals for later processing by a processor, for example a computer 32. The computer 32 may comprise—or communicate with—a memory 34 which can store the data processed by the computer 32, or the data to be processed by the computer 32. Any type of memory device accessible by a computer and allowing storage of the desired quantity of data and/or codes can be used. Moreover, the memory 34 may include one or several memory devices, of similar or different types, which can be local or remote relative to the system 10. The memory devices can store data, processing parameters and/or computer programs to carry out the various processes described here.

The computer 32 is typically used to control the tomosynthesis device 10. To this end, the computer 32 is configured to receive commands and acquisition parameters by an operator through a work station 36, traditionally equipped with a mouse, a keyboard and/or other peripherals.

A display screen 38 coupled to the work station allows displaying of the reconstructed image. The image can also be printed using a printer 40, which can be coupled to the work station. Moreover, the work station can also be coupled to a picture archiving and communication system 42 (PACS). The PACS 42 can be coupled to a remote system 44, such that other people can access the image and image data remotely.

Of course, this example is in no way exhaustive and each of the devices presented above can be coupled to other devices, according to the desired implementation.

The data collected by the detector 22 typically undergoes correction, pre-processing and/or calibration in the acquisition system 30 and/or the computer 32 to condition the data so as to visualize the integrals of the attenuation coefficients of the objects analyzed along the rays going from the source to the detector. The processed data, commonly called projection images, can be used by a reconstruction algorithm. In tomosynthesis, one acquires a certain number of projection images, each according to a different angle relative to the subject and/or the detector. Tomographic reconstruction algorithms are well known by those skilled in the art and enable the formation of a three-dimensional image of the volume from the projection images.

BRIEF DESCRIPTION OF THE INVENTION

According to the invention, a method for displaying a volume obtained by tomosynthesis is proposed, comprising the steps of:
displaying a bidimensional slice or slab image,
selection on the displayed image of at least one volume of interest associated with a bidimensional region of interest located in the plane of the image,
displaying in the region of interest, according to the practitioner's wishes:
images of slices of the volume of interest; and/or
three dimensional images of the volume of interest; and/or
slabs obtained from the volume of interest.

Advantageously, to define a volume of interest in step ii), one defines, on the displayed image, the position and size of a bidimensional region of interest, the position of the volume of interest being defined by the position of the region of interest and the depth of the volume of interest being adjusted automatically or manually.

In the case where the displayed image is a slab, one defines the depth of the volume of interest as equal to the thickness of the slab, the central slice of the volume of interest corresponding to the central plane of the slab.

According to one variation of the method, to define the depth of the volume of interest, one adjusts said depth to the length or width or diameter of the region of interest, the central slice of the volume of interest corresponding to the plane of the displayed image.

According to one particular embodiment, one defines a cubic, spherical volume of interest, respectively, from a square, round region of interest, respectively.

Particularly advantageously, one considers, in the volume of interest, images of reconstructed slices with a depth sampling interval smaller than the depth sampling interval of the volume, the displayed images in the region of interest in step iii) resulting from these reconstructed slices with a smaller sampling interval.

Optionally, one segments the volume of interest so as to detect radiological signs such as lesions or fractures and in that one implements, on the displayed images in the region of interest, background suppression processing and/or processing to bring out said detected radiological signs.

For each radiological sign detected in the volume of interest, one can then determine the so-called optimal slice wherein the radiological sign is the most clearly visible and in that the image displayed in the region of interest is obtained by a combination of voxels located in the optimal slice of each radiological sign.

One can also calculate a slab or three-dimensional images of the volume of interest by calculating the average intensity, maximum intensity or minimal intensity of the voxels, or indeed any mathematical operator, along parallel or conical rays, on the height of the volume of interest.

One can also implement a volume or surface rendering technique to display three-dimensional images of the segmented volume of interest.

Particularly advantageously, one memorizes the position and size of the volumes of interest selected in step ii), the display mode selected in step iii) and/or the content of the images displayed in the region of interest.

When one successively displays images of bidimensional slices or slabs of the volume, the memorized volumes of interest having an intersection with each of these bidimensional slice or slab images can then be automatically displayed.

Through an action by the practitioner, one can display images of the slice or slab, respectively, corresponding to or centered on, respectively, the central slice of at least one memorized volume of interest.

Another object of the invention relates to a system for displaying images acquired by tomosynthesis, comprising:
display means for a bidimensional image of a slice or slab,
means for selecting, on the displayed slice image, a volume of interest associated with a region of interest located in the plane of the image,
means for displaying, in the region of interest, according to the practitioner's wishes:
slice images of the volume of interest, and/or
three-dimensional images of the volume of interest; and/or
slabs obtained from the volume of interest.

This system may also include means for exporting, saving, printing and/or recovering information relative to the volume of interest.

Another object of the invention relates to a radiology device, of the type comprising an X-ray source, data acquisition means and data processing means and the display system according to the invention.

Preferably, the display method described above will be implemented using a processing device comprising means for implementing the steps of the processing method, such as a PC-type computer comprising memory and a processing unit whereon a computer program is executed.

This computer program will comprise in particular one or several algorithms making it possible to carry out the steps of the method previously described. One embodiment of the invention relates to a computer program as such recorded on a computer-readable medium.

BRIEF DESCRIPTION OF THE DRAWINGS

Other characteristics and advantages of the invention will appear from the following description, which is purely illustrative and non-exhaustive, and must be read with regard to the annexed figures in which.

DETAILED DESCRIPTION OF THE INVENTION

In the case of DBT imaging, images of the patient's breast are taken at different angles so as to be able to reconstruct a three-dimensional representation of the breast. Once reconstructed, this three-dimensional representation makes it possible to observe and localize the internal structures of the breast. It is typically made up of a set of slices parallel to the detector, which, superimposed, represent the volume of the compressed breast. In these slices, the practitioner can detect anomalies such as opacities, microcalcification foci, which can be benign or malignant lesions.

Figure 1:
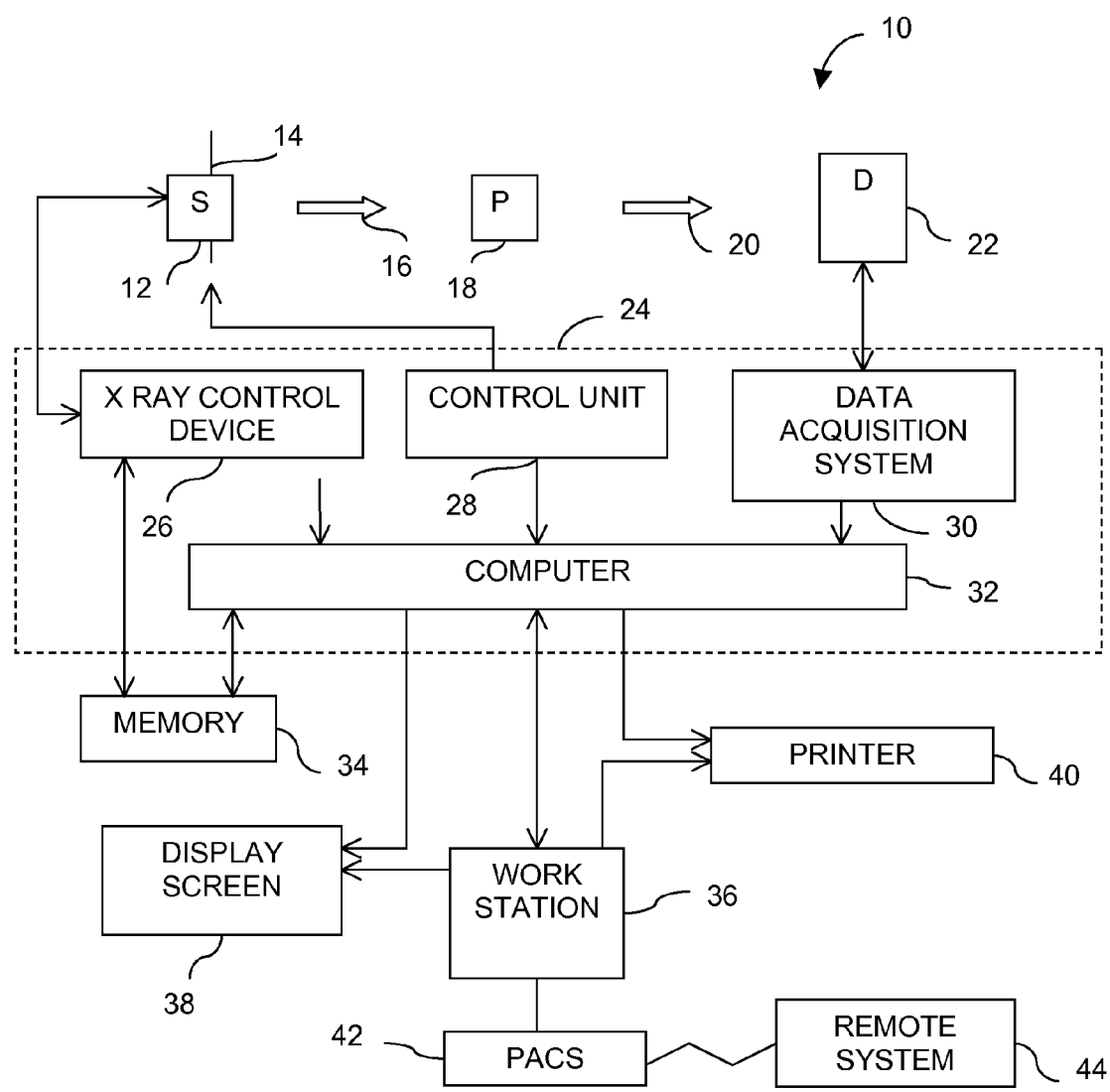
FIG. 1 is a diagrammatic illustration of a prior art tomosynthesis imaging device.
Figure 2:
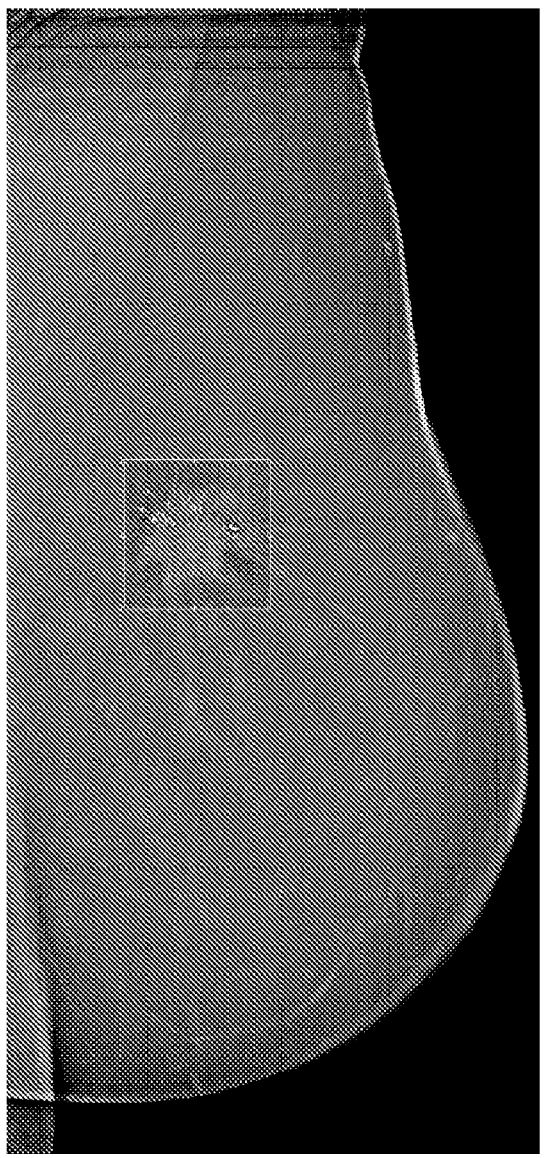
FIG. 2 illustrates an example of images of a breast displayed according to a method according to one possible embodiment of the invention.

As illustrated in FIG. 2, it is proposed to the practitioner to display, in a window, on a two-dimensional image which can be an image of a slice or a slab, thumbnail images corresponding to a region of particular interest including, for example, a lesion which the practitioner will have been able to detect and wishes to analyze more specifically. In this window, a particular local display such as adjustment of the local dynamic, zoom and/or enhancement of radiological signs can be applied.

The practitioner can proceed with his analysis on a volume of interest (VOI) comprising slices next to the slice whereon the region of interest was placed.

This volume of interest can be defined automatically by a computer-aided detected (CAD) system, or manually.

When a computer-aided detection system is used, the position, length, width and depth of this volume of interest are defined automatically.

In the case of manual definition of the volume of interest, the position (parallel to the detector), the length and width of this VOI ([X-min, X-max], [Y-min, Y-max], respectively) are determined from the slice (or slab) of interest, for example by moving and resizing the edges of a 2D window around the lesion. Several methods of defining the Z position (perpendicular to the detector) and the depth of the volume of interest defined by the interval [Z-min, Z-max] are then possible:

The depth can be dimensioned on views orthogonal to the detector. However, these views are not necessarily very readable because the information is damaged due to reconstruction artifacts which are due to the limited angle of acquisition.

Another possibility is to define the Z-min and Z-max values by indicating the corresponding slices at the beginning and end of the lesion. To this end, the practitioner looks for the first slice containing the lesion, which he records by pressing a button. He them moves through the slices toward the top or bottom, until the last slice of the lesion, which he records in a similar manner. Thus, the depth of the volume of interest corresponds to the thickness of the lesion.

A third possibility is to define the depth from the slice of interest by progressively increasing the thickness of the slab centered on the slice of interest until it includes the lesion, the slab being a combination of neighboring slices. The slice of interest then corresponds to the central slice of the volume of interest.

According to a fourth possibility, the depth can also be defined by default according to the length and/or width of the 2D window. In a particular embodiment, when one uses a square window, a corresponding cubic volume of interest can be defined by considering a depth equal to the length and width. The slice of interest then corresponds to the central slice of the volume of interest. The depth can then be adjusted by the user. This manner of defining the depth is well-adapted when the radiological signs sought are distributed isotropically in the volume.

Lastly, in the case where the displayed image is a slab, the depth of the volume of interest can be defined as equal to the thickness of the slab.

The system then has a function granting the practitioner different ways of displaying 3D information in the 2D window, which will be described below.

We specify that the invention is in no way limited to a display in a rectangular window, but that any suitable window shape can be employed, such as, for example, a circle giving rise to a spherical volume of interest. The terms "length" and "width" of the window then more broadly signify the maximum dimensions of the window in an orthonormed reference (X, Y) of the image—meaning, in the particular case of the circle, its diameter.

Figure 3A:
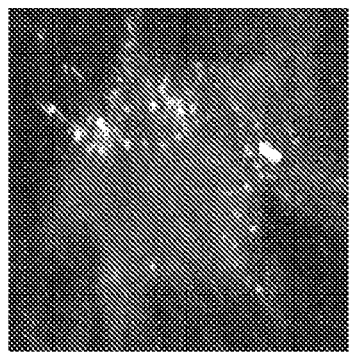
FIGS. 3a to 3e illustrate different types of displays which may be produced in the display window of FIG. 2.

Display Method of a 3D Volume of Interest:

The display in the window can be done using a slab calculated in all of the sub-images of the volume of interest, as illustrated in FIG. 3a. To this end, one applies an operator (of the MIP (Maximum Intensity Pixel) type or average or minimal intensity or any other suitable operator known by those skilled in the art) along the Z axis (axis perpendicular to the detector) on slices having a height between Z-min and Z-max. In this case, the combination of the slices is done considering parallel rays according to the Z-axis.

The slab can also be calculated by taking an average of the intensity of the voxels or by considering the maximum (or minimum) value along the paths traveled by the rays between the source and the detector and between Z-min and Z-max. This operation provides a volume of interest in reprojection resembling a standard acquisition of a volume of interest. The advantage of this representation is that the practitioner can analyze volumes of interest in the same way he analyzes the 2D projections to which he is accustomed. This reprojection also takes into account the conical geometry of the acquisition system which, relative to a combination according to the Z-axis, reduces the impact of the reconstruction artifacts in the displayed slab and benefits from a better arrangement of the local structures.

Figure 3B:
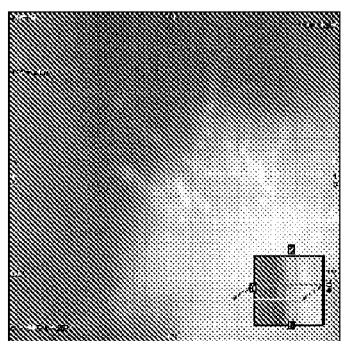
Figure 3C:
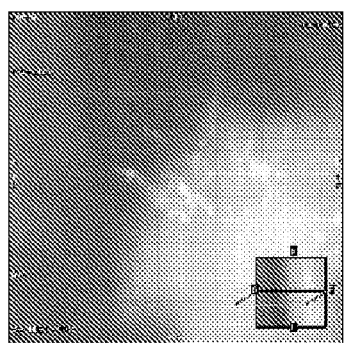

According to one variation, in reference to FIGS. 3b and 3c, a "cine-loop" display is implemented wherein the machine automatically displays, in the window, the different slices corresponding to the volume of interest. Only the slices between Z-min and Z-max are displayed.

These different images are displayed consecutively, for example progressing at the rhythm of approximately ten images each second, or the user can pass from one image to the next manually. This set of images, or a subset thereof, can also be displayed at another place on the screen so as to simultaneously show all of the information contained in the volume of interest.

Figure 3D:
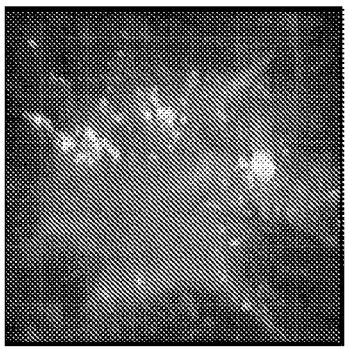
Figure 3E:
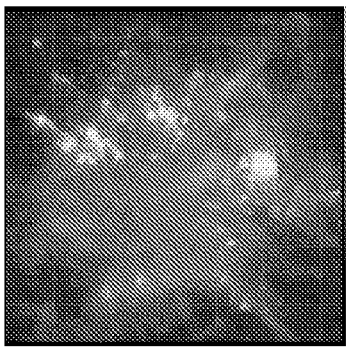

According to another variation, as illustrated in FIGS. 3d and 3e, it is possible to display a 3D view of the selected zone by successively displaying views resulting from different camera positions, obtained either by integration along rays parallel to the direction of the optical axis of the camera, or by selection of the maximum (or minimum) along the rays or any other suitable operator known to those skilled in the art. This integration can be calculated by considering parallel rays or rays respecting the geometry ("tumble view") given the presence of reconstruction artifacts in the direction orthogonal to the detector. These artifacts come from the fact that the projection images are acquired with low angulation of the source.

Display Method for the Segmented 3D Volume of Interest:

Moreover, these different views can be processed so as to bring forward the objects which may constitute microcalcifications or opacities and/or reduce the visibility of the surrounding tissues.

This operation, which allows faster and more precise analysis of the information contained in the volume of interest, requires a segmentation step. Segmentation of the volume of interest makes it possible to automatically detect voxels constituting potential radiological signs.

To this end, the intensity of the segmented voxels may be enhanced with regard to the intensity of the tissues surrounding the lesion to which they belong. In one particular embodiment, the intensity of calcium voxels can be brought to a level greater than the maximum intensity level of all the voxels of the volume. This technique makes it possible to guarantee that during 3D display of the volume of interest or slabs with the help of an MIP operator, the segmented lesions are shown and are not hidden by dense tissues. One can also apply processing able to reduce the display of artifacts in the Z direction by using previously obtained information such as the shape of the microcalcifications (which one can assume to be rather isotropic, for example).

It is also possible to display a volume wherein one attributes a determined value to the voxels of the lesions whereas other voxels are assigned a different value, so as to make the volume of interest binary. In this way, one can display the microcalcifications or segmented masses in 3D in the two-dimensional window using a surface rendering or volume rendering technique. Appropriate processing to reduce the artifacts in the Z direction can also be applied. The primary advantage of making the volume of interest binary is that the practitioner can more precisely assess the relative position of the microcalcifications in the volume of interest, which is important clinical information. It can also more easily measure the relative distance of microcalcifications or the reach of the lesions.

Figure 4A:
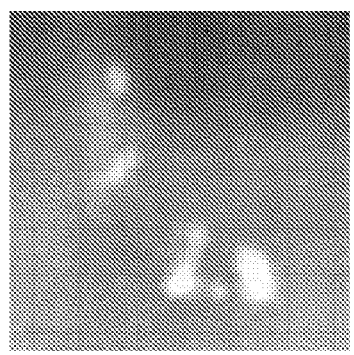
FIGS. 4a to 4d illustrate two other display methods which may be produced in the image window of FIG. 2.
Figure 4B:
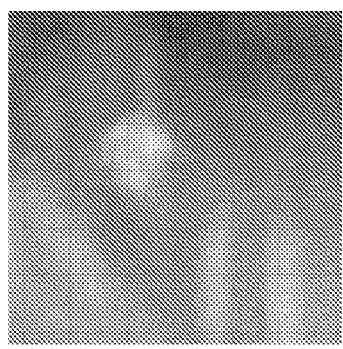
Figure 4C:
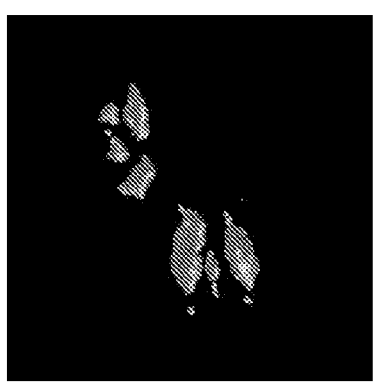
Figure 4D:

The images obtained are, for example, of the type illustrated in FIGS. 4c and 4d, obtained from a volume of interest, two slices of which are shown in images 4a and 4b.

Method of Displaying the Volume of Interest in High Definition:

Moreover, when the practitioner seeks information requiring significant precision, one can use a Z sampling interval much smaller in the selected window that the inter-slice distance of the volume.

Indeed, for reasons of computing power and memory size, the distance between two slices is typically in the vicinity of 1 mm.

The size of the microcalcifications can vary between 100 µm and 1 mm. Thus the intensity of voxels corresponding to an average microcalcification will be generally generated by reconstruction artifacts. Moreover, one knows that the contrast to noise ratio (CNR) of a spherical microcalcification is optimal for the slice going through the center of the microcalcification. Consequently, with a slice spacing in the vicinity of 1 mm, there is a risk of not displaying the microcalcifications optimally.

However, if one limits oneself to a more limited volume of interest, it is then possible to calculate, in real-time, a volume in high definition, with a Z sampling interval at least equal to the X and Y sampling intervals. This high definition volume can be obtained using reconstruction techniques known to those skilled in the art, such as SBP, FBP, ART, SART, MLEM for example. Thus, more precise contours can be observed coming from the real presence of calcium and not from reconstruction artifacts.

Moreover, when one limits oneself to a volume of interest, it is also possible to produce high definition segmentation in real time. This can require, for faster processing, projections filtered prior to reconstruction.

From the high definition volume of interest, a slab display, "cine-loop" display or display of 3D views with enhanced or segmented pixels can then be proposed in the 2D window. As we saw above, for the 3D view, one can apply a surface rendering or volume rendering technique when the volume of interest has been made binary. Suitable processing to reduce artifacts in the Z direction can also be applied.

For each segmented microcalcification of the volume of interest, the slice procuring optical display of this microcalcification can be determined automatically by maximizing the contrast to noise ratio (CNR), for instance. Thus, the image displayed in the window can be obtained through a combination (according to parallel rays or rays respecting the conical geometry of the system) of the voxels located in the various optimal slices. This allows the practitioner to have an overall view of the volume of interest containing a set of optimal information for a faster analysis of microcalcifications.

Of course, as one will understand, one can simultaneously define, in the volume, several volumes of interest, and this tool enables the practitioner to open several windows in the image he has.

Also, the information that is displayed in this (these) window(s) can be the subject of memorization and/or export, for example to be printed, engraved on a DVD, integrated into a report or on a video. The various volumes of interest can be exported individually or exported in only one image which indicates their relative positions in the volume.

The various volumes of interest can be displayed dynamically during a display of the successive slices of the volume. The volumes of interest then appear and disappear according to whether they have a intersection with the displayed slice. The display system can also incorporate a navigation mechanism making it possible to go from one volume of interest to another without having to visualize all of the intermediate slices, by a simple action of the practitioner on a control. The system can also, by an action of the practitioner, display the slices of the volume corresponding to the central slice of the volumes of interest (the term "bookmark" is used) or the slabs obtained by integrating slices going from the minimum height to the maximum height of the volumes of interest.

The information needed to recover the volumes of interest processed, such as the position of the volumes of interest, or the processing applied, can be exported for saving and a later second reading on a work station or a PACS. Any other information relative to the volumes of interest provided by the practitioner and/or a computer-aided detection (CAD) system, such as the nature of the identified element (mass, cluster or microcalcification), the BI-RAD code, the size of the lesions, the lesion-breast distance, or an index of reliability on the lesion, can also be exported. Particularly advantageously, it is also possible to memorize, for each window, the adjustments made by the practitioner for local analysis of the volume, such that these adjustments are automatically applied during later readings (referred to as "save state").

The preceding description is applicable to mammography by tomosynthesis (DBT), but the invention may also be applied to the visualization of other organs in traditional radiology.

Figure 5:
FIG. 5 illustrates two display methods which may be produced on the image of a hand.

Thus, FIG. 5 illustrates a radiographic image of a hand, wherein two windows have been defined. In the upper window, the edge of which is a dotted line, a volume of interest is displayed in "cine-loop" mode with a magnification factor. This therefore makes it possible to zoom on the entirety of a joint of the middle finger distributed over several slices. The lower window corresponds to the display of the 3D volume of interest wherein one can observe a fracture.

Figure 6:
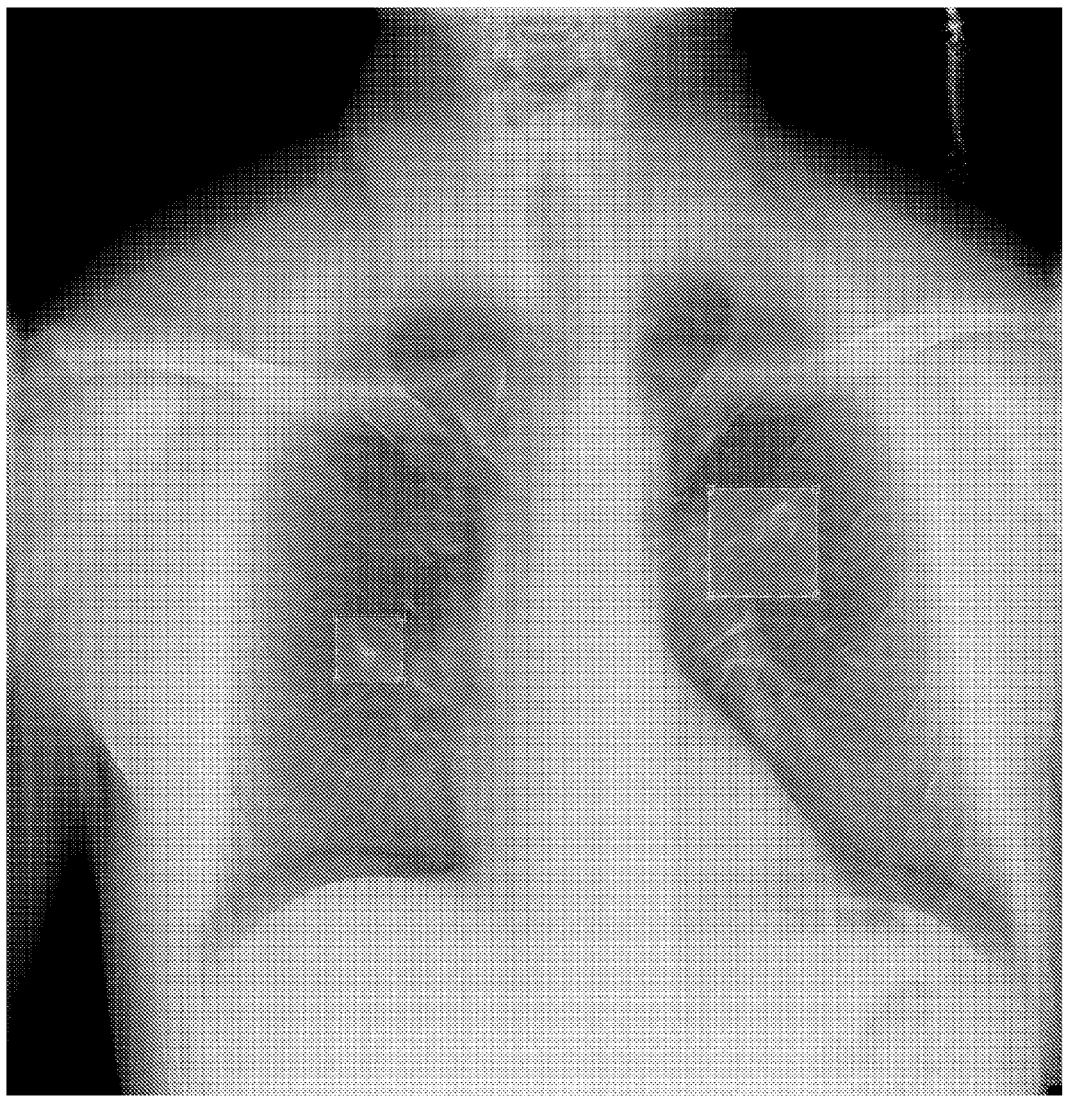
FIG. 6 illustrates two display modes which may be produced on a radiograph of the lungs.

Another embodiment of the invention is illustrated in FIG. 6, which illustrates a radiographic image of the lungs of a patient. In a first window, located on the left of the image, a 3D volume of interest of a potentially cancerous pulmonary nodule is displayed. In the second window, located on the right of the figure, a slab of the volume of interest is displayed.

As one will understand, the invention therefore allows, in a particularly advantageous manner, the practitioner to locally define a volume of interest and to obtain 3D information from slices of the volume or from slabs, and to display this information in a 2D window.

Moreover, the invention allows the display of more precise information, showing the voxels corresponding to the radiological signs, and consequently a faster reading and more precise assessment of the relative position of these signs in the volume of interest.

It also makes it possible to display high-definition 3D information limited to the volume of interest, in order to more precisely determine the contour, intensity and shape of the radiological signs.

Lastly, it goes without saying that the invention is not limited to the examples described above, but can be applied more generally to the visualization of radiological signs in images obtained using the tomosynthesis technique.

What is claimed is:

1. A method for displaying a volume obtained by tomosynthesis, the method comprising:
   displaying a two-dimensional image of a slice or slab;
   receiving user input that defines, on the displayed two-dimensional image, a two-dimensional region of interest located in a plane of the image; and
   displaying, in the displayed two-dimensional image within the region of interest at least one of:
     images of the slices of a volume of interest associated with the two-dimensional region of interest;
     three-dimensional images of the volume of interest associated with the two-dimensional region of interest; and
     slabs obtained from the volume of interest associated with the two-dimensional region of interest.

2. The method of claim 1, wherein defining the region of interest further comprises:
   defining, on the displayed two-dimensional image, a position and size of a two-dimensional region of interest,
   wherein a position of the volume of interest is defined by the position of the region of interest, and
   wherein a depth of the volume of interest is adjusted automatically or manually.

3. The method of claim 2, wherein, when the displayed image is a slab, the depth of the volume of interest is equal to the thickness of the slab, and a central slice of the volume of interest corresponds to a central plane of the slab.

4. The method of claim 2, wherein defining the depth of the volume of interest further comprises:
   adjusting said depth to a length or width or diameter of the region of interest,
   wherein a central slice of the volume of interest corresponds to the plane of the displayed image.

5. The method of claim 1, further comprising:
   defining a cubic volume of interest from a square region of interest; and
   defining a spherical volume of interest from a circular region of interest.

6. The method of claim 1, further comprising:
   defining for the volume of interest, a depth sampling interval smaller than a volume sampling interval; and
   displaying, within the region of interest, images resulting from reconstructed slices having the smaller depth sampling interval.

7. The method of claim 1, further comprising:
   segmenting the volume of interest to detect radiological signs such as lesions or fractures;
     performing background suppression processing; and/or
     processing the segmented volume of interest to emphasize said detected radiological signs on the displayed images.

8. The method of claim 7, further comprising, for each radiological sign detected in the volume of interest:
   determining an optimal slice in which the radiological sign is the most clearly visible; and
   combining voxels located in the optimal slice of each radiological sign to obtain the image displayed in the region of interest.

9. The method of claim 1, further comprising:
   determining a slab or three-dimensional images of the volume of interest by calculating an average intensity, maximum intensity or minimum intensity of the voxels, or any mathematical operator, along parallel or conical rays, on the height of the volume of interest.

10. The method of claim 7, further comprising:
    implementing a volume of surface rendering technique to display three-dimensional images of the segmented volume of interest.

11. The method of claim 1, further comprising:
    memorizing the position and size of the defined region of interest and/or content of the images displayed in the region of interest.

12. The method according to claim 11, wherein when images of two-dimensional slices or slabs of the volume of interest are successively displayed, the memorized volumes of interest having an intersection with each of these images of two-dimensional slices or slabs automatically display themselves.

13. The method of claim 11, further comprising:
    displaying, in response to input received from a user, the slice that corresponds to the central slice of at least on memorized volume of interest, or
    displaying, in response to input received from a user, the slab images that are centered on the central slice of at least one memorized volume of interest.

14. A system for displaying images acquired by tomosynthesis, the system comprising:
    means for displaying a two-dimensional image of a slice or slab;
    means for selecting, on the displayed two-dimensional image, a two-dimensional region of interest located in the plane of the image; and
    means for displaying, in the displayed two-dimensional image within the region of interest at least one of:
      slice images of a volume of interest associated with the two-dimensional region of interest;
      three-dimensional images of the volume of interest associated with the two-dimensional region of interest; and
      slabs obtained from the volume of interest associated with the two-dimensional region of interest.

* * * * *